(12) United States Patent
Mallila (10) Patent No.: US 7,457,282 B2
(45) Date of Patent: Nov. 25, 2008

(54) METHOD AND APPARATUS PROVIDING SMOOTH ADAPTIVE MANAGEMENT OF PACKETS CONTAINING TIME-ORDERED CONTENT AT A RECEIVING TERMINAL

(75) Inventor: Jani Mallila, Oulu (FI)

(73) Assignee: Nokia Corporation, Espoo (FI)

( * ) Notice: Subject to any disclaimer, the term of this patent is extended or adjusted under 35 U.S.C. 154(b) by 1096 days.

(21) Appl. No.: 10/696,252

(22) Filed: Oct. 29, 2003

(65) Prior Publication Data

US 2005/0094622 A1    May 5, 2005

(51) Int. Cl.
*H04L 12/66*    (2006.01)
(52) U.S. Cl. ..................................... 370/352
(58) Field of Classification Search ................. 370/352
See application file for complete search history.

(56) References Cited

U.S. PATENT DOCUMENTS

| 6,259,677 B1 | 7/2001 | Jain | 370/252 |
| 6,549,587 B1* | 4/2003 | Li | 375/326 |
| 2002/0067744 A1* | 6/2002 | Fujii et al. | 370/535 |

FOREIGN PATENT DOCUMENTS

| EP | 1349342 A1 | 10/2003 |
| WO | WO-00/42749 A1 | 7/2000 |

OTHER PUBLICATIONS

Wayman et al., "Some Improvements on the Synchronized-Overlap-Add Method of Time Scale Modification for Use in Real-Time Speech Compression and Noise Filtering", IEEE Transactions on Acoustics, Speech, and Signal Processing, vol. 36, No. 1, Jan. 1988, pp. 139-140.

Verhelst et al., "An Overlap-Add Technique Based on Waveform Similarity (WSOLA) for High Quality Time-Scale Modification of Speech", IEEE 0-7803-0946-4/93, pp. II 554-II 557.

Ramjee et al., "Adaptive Playout Mechanisms for Packetized Audio Applications in Wide-Area Networks", IEEE 0743-166X/94, pp. 5d.3.1-5d.3.9.

Liang et al., "Adaptive Playout Scheduling Using Time-Scale Modification in Packet Voice Communications", Information Systems Laboratory, Dept. of Electrical Engineering, Stanford University, Stanford, CA 94305, 4 pgs.

* cited by examiner

*Primary Examiner*—Ramnandan Singh
(74) *Attorney, Agent, or Firm*—Harrington & Smith, PC (57) ABSTRACT

Disclosed is a method and a device for coupling to a packet switched network for receiving data packets containing time ordered information such as voice. In accordance with a method for operating a Voice over IP capable device that is coupled to a packet network, and a device that operates in accordance with the method, there is disclosed receiving and buffering data packets that comprise voice information; decoding the voice information to obtain voice samples; and buffering the decoded voice samples prior to generating a voice play-out signal, where the decoded voice samples are time scaled as a function of packet network conditions to adjust the Buffering Delay and to enable changing the voice play-out rate to provide a substantially continuous output voice signal regardless of the variation in the rate at which the data packets are received.

35 Claims, 7 Drawing Sheets

METHOD AND APPARATUS PROVIDING SMOOTH ADAPTIVE MANAGEMENT OF PACKETS CONTAINING TIME-ORDERED CONTENT AT A RECEIVING TERMINAL

TECHNICAL FIELD

This invention relates generally to telecommunications devices and terminals and, more specifically, relates to terminals that are connected to packet switched networks, and that are capable of receiving voice-containing packets, such as in VoIP (Voice over Internet Protocol) calls. Although described primarily in the context of receiving and playing out voice-containing packets, this invention applies as a well to packets containing video information, and in general to packets that convey time-ordered content that is intended to be presented to a listener or a viewer in a substantially continuous and substantially uniform temporal sequence (i.e., in a manner that is substantially free of interruptions and discontinuities). Voice content and video content are two primary, but non-limiting, examples of time-ordered content.

BACKGROUND

In packet switched systems, such as the General Packet Radio System (GPRS) wireless system, the uncertainty due to variations in data packet arrival times can have a significant impact on system performance. Reasons for the variation in packet arrival times include congestion of network resources and route variations between successive packets. When the packets contain voice data, as in a VoIP system, in order to obtain a continuous voice output the buffering depth, or buffering delay at the data packet receiver must be proportional to the variations in packet arrival times.

A conventional fixed initial delay data buffer can remove the variations to some extent. It is, however, very likely that the network conditions will vary depending on congestion of network resources, the location of the receiving terminal and the specific implementation of the network components. With conventional (fixed delay) buffering it is impossible to react to changing network conditions. In addition, when the throughput is consistently low it is impossible to prevent receiver buffer underflows.

For these reasons some type of adaptive buffer management needs to be introduced if optimal operation is desired in terms of buffering delay and minimal interruptions in output voice. The buffer management should be capable of changing the buffering delay in as smooth a manner as possible. Stated another way, it is most desirable if the change of buffering delay is done at same ratio over a longer interval, than if the buffering delay is first decreased then increased and then decreased again and so on over short intervals. To prevent these fluctuations the prevailing network conditions should be estimated as closely as possible. In order to accomplish this estimation, it is important to first define what important network characteristics should be the subject of the estimation.

At least two prior art buffer management techniques have required accurate knowledge of the network end-to-end delay: Ramjee R. (1994), "Adaptive Playout Mechanisms for Packetized Audio Applications in Wide-Area Networks", in IEEE INFOCOM '94, The Conference on Computer Communications Proceedings, 12-13 June, Toronto, Vol.2. pp. 680-688, Canada; and Liang Y. J. (2001), "Adaptive Playout Scheduling Using Time-Scale Modification in Packet Voice Communications", in IEEE International Conference on Acoustics, Speech, and Signal Processing Proceedings, 7-11 May, Salt Lake City, Vol. 3, pp 1445-1448, USA.

Due to fact that an exact knowledge of network end-to-end delay is currently not possible to obtain, another technique has been proposed that does not require this information: Telefonaktiebolaget L M Ericsson. "Adaptive Jitter Buffering", WO 00/42749. This approach attempts to estimate network conditions over a fixed sampling interval. While this approach may have some use when interruptions (delay spikes) occur at relatively short intervals, if the interval between successive interruptions is greater than the sampling interval then there can be cases where no interruption will occur during one of the sampling intervals. From this it follows that the control mechanism will decrease the buffering delay, as opposed to the situation where the interruption would have occurred. Now if the interruption occurs during the next sampling interval it causes an undesired interruption in speech due to buffer underflow. After the speech interruption the buffering delay is increased once again during the following sampling interval. As can be appreciated, this type of operation can readily lead to the situation where the buffering delay is decreased/increased/decreased and so on by the control mechanism, resulting in unnecessary fluctuations in the playout rate. In addition, some fixed number of packets must be accumulated before performing the buffering delay change (sampling interval). This results in a slower reaction time when packets arrive at a reduced rate, and potentially increases the possibility of interruptions because the buffering delay is increased only after the sampling interval. In the approach of WO 00/42749 the change in the buffer delay is accomplished by discarding or delaying packets, where more specifically the change is made during a silent period by adding or removing speech frames containing silence. However, adding or removing only silence leads to changes in the time relation between silent periods and speech periods, which can result in unnatural sounding very long or very short silences between sentences or even between words. The duration of the silent periods can vary from sentence to sentence or from word to word, and therefore results in an unnatural rhythm to the speech.

In general, the adaptive buffer management should be applied only when it is needed. The situation in a packet switched network may well be such that the packets arrive in bursts, and between each burst there is a long (perhaps several seconds) delay. This is not a problem if the long-term arrival interval average is the same as the rate at which the packets were created. This means only that the physical buffer size should be long enough at the receiver side to accommodate the variations. However, in the design of the adaptive management this should be considered, since the play-out rate of voice should not annoyingly fluctuate if the buffering delay fluctuates.

It can thus be appreciated that the current approaches to dealing with the variability of arrival times of data packets containing voice or video signals are not satisfactory, and do not adequately address the problems inherent in providing natural sounding voice in VoIP and other types of data packet-based network systems.

SUMMARY OF THE PREFERRED EMBODIMENTS

The foregoing and other problems are overcome, and other advantages are realized, in accordance with the presently preferred embodiments of these teachings.

Disclosed is a method and a device for coupling to a packet switched network for receiving data packets containing time-ordered content, such as voice or video information. In accordance with a method for operating a Voice over IP capable device that is coupled to a packet network, and a device that operates in accordance with the method, there is disclosed receiving and buffering data packets that comprise voice information; decoding the voice information to obtain voice samples; and buffering the decoded voice samples prior to generating a voice play-out signal, where the decoded voice samples are time scaled as a function of packet network conditions to adjust the buffering delay and to enable changing the voice play-out rate to provide a substantially continuous output voice signal regardless of the variation in the rate at which the data packets are received.

There is a substantially asynchronous component that measures and estimates data packet arrival delays, and a substantially synchronous component that is responsive to the operation of the asynchronous component to control the buffering delay, where the buffering delay is controlled synchronously based on a scaling ratio that is determined at each voice frame interval (e.g., at each 20 ms interval), based on the time scaling of the decoded voice samples.

The buffering delay of a receiver packet buffer is determined as a difference between a given packet's play-out time and the arrival time of the packet, and the method further includes revising estimates of buffering delay, packet interruption delay, and packet arrival interval that are updated based on the measured buffering delay and arrival interval.

In a presently preferred embodiment the method estimates the buffering delay to be equal to a virtual play-out point plus a packet creation interval times (an incoming packet's sequence number, less a first packet's sequence number), less the incoming packet's arrival time. The Virtual Play-out Point is changed during a session where the end-to-end delay is changed due to Time Scaling of the voice or other signal, buffer overflows or buffer underflows. A result is that the packets are played out at unsteady intervals. For simplicity, all end-to-end delay changes may be associated with one variable that is defined as the Virtual Play-out Point. In essence, the Virtual Play-out Point is the Play-out Point that should have been used for the first packet of a session, if the remainder of the packets would have been played out at a steady intervals, while still resulting in the same end-to-end delay as with the actual non-steady play-out of packets.

Preferably decoding includes detecting a type of received voice frame as being one of a bad frame, no frame, or a good frame, and time scaling is performed only if the type of the received voice frame is detected as being a good frame. A "bad frame" can be considered to be frame that is not usable either because it is discarded due to late arrival, or due to erroneous content. A "no frame" condition indicates that the buffer is empty, while the "good frame" condition implies that a valid frame is extracted from the buffer.

A feature of this invention is that the two concepts related to packet throughput are treated separately, i.e., the arrival interval average of packets and the interruption average. By means of this separation it becomes possible to reduce the fluctuations in the scaling ratio as compared to conventional approaches. Also, due to the estimation of the arrival interval average the scaling ratio can be more precisely set to a value such that the buffering delay remains substantially constant when the network link has a constantly low, or high, throughput for packets.

The use of the conventional sampling interval, for example as proposed in WO 00/42749, is avoided in this invention by using an exponential estimation of network condition parameters. Also, the estimation of interruption delays over the session enables maintaining substantially continuous voice in environments where the interval between successive interruptions is relatively long.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein.

DETAILED DESCRIPTION OF THE PREFERRED EMBODIMENTS

Before discussing this invention in further detail, several terms and phrases are herewith defined for the purposes of this invention.

A Scaling Ratio is a ratio between time scaled and original signal lengths.

Time Scaling is an operation that removes or copies input samples, according to a desired scaling ratio, so that a ratio between the numbers of input and output samples corresponds to the desired scaling ratio. When performed for voice samples the strong periodicity of voice is considered such that the spectral information does not radically change. Time Scaling can be achieved when one or multiple periods are either copied or removed. Also, time scaling can be considered as adding or removing silence during silence intervals during voice.

A Voice Packet is a data structure that contains encoded parameters corresponding to one or more voice frames.

A Decoding Block is a functional unit that extracts the encoded parameters from Voice Packets for each voice frame and performs the decoding (for example AMR or GSM) according to the extracted parameters.

Interruption Delay is the delay between successive packets that is sufficiently long so that it can be considered as an interruption in packet arrivals.

A Play-out Point is a time instant at which a first frame of a packet is extracted out from a packet buffer.

Figure 10:
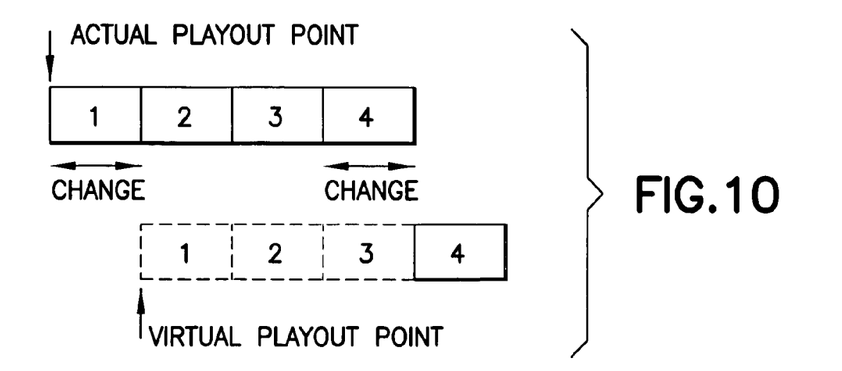
FIG. 10 is a diagram that is useful in explaining a change in a Virtual Play-out point.

A Virtual Play-out Point (see FIG. 10) is changed during a session where the end-to-end delay is changed due to Time Scaling of voice, buffer overflows or buffer underflows. A result is that the packets are played out at unsteady intervals.

For simplicity all end-to-end delay changes may be embedded within or associated with one variable that is defined as the Virtual Play-out Point. In essence, the Virtual Play-out Point is the Play-out Point that should have been used for the first packet of a session, if the remainder of the packets would have been played out at steady intervals, while still resulting in the same end-to-end delay as with the actual non-steady play-out of packets.

The Buffering Delay is a time period that a packet resides in the packet buffer before play-out of the first frame of the packet. In other words, the Buffering Delay is the time between the Play-out Point of the first frame of a packet and the arrival time of that packet.

Although described below primarily in the context of received data packets that contain voice information, and as was noted above, it should be appreciated that this invention can be employed to advantage with other types of data packet content, including video information. In the case of video information the time scaling operation described below can be performed by inserting or removing video frames or samples. If the video and audio portions are controlled separately, lip synchronization can be achieved by keeping a virtual playout point for each portion equivalent.

By way of introduction, in the presently preferred embodiment of this invention a change in the packet buffering delay is performed using a time scaling method, which provides for the possibility to change the play-out rate of voice without introducing significant changes in the spectral or frequency content of the voice.

In accordance with this invention the play-out of voice frames can be started immediately after the first packet has arrived. The initial buffering delay is therefore zero, and it is increased as needed to accommodate the variations in packet arrivals. Alternatively, the start of the play-out may be delayed until the initial buffering delay is sufficiently great. During voice play-out the buffering delay is maintained at a desired level by reacting to changes in the throughput of the packets. The control of the buffering delay is preferably based on an estimation of network characteristics, and the reaction is made by modifying the rate at which voice is played out. This modification is preferably accomplished by using a time scaling method. The overall adaptive buffer management contains two major components, one asynchronous and the other synchronous, as described in detail below.

Briefly, the asynchronous component is performed only when a packet arrives, and therefore it is performed asynchronously with the operation of the system (assuming that the arrival of packets is asynchronous to the operation of the system). As a packet arrives it is stored in the packet buffer and the buffering delay for the packet is measured, where the buffering delay is the difference between the packet's play-out point in time and the arrival time of that packet. After this measurement the estimates of delays (buffering delay, interruption delay, arrival interval) are updated. The synchronous component is performed at synchronous intervals of length one voice frame, such as intervals of 20 ms for AMR or GSM voice frames. The estimates are used to control the buffering delay so that the buffering delay is maintained at a level that is great enough to accommodate the packet arrival variations. The control mechanism in this case supplies information related to time scaling for determining the ratio at which the signal should be scaled. In addition, the number of voice decoding operations performed during each interval depends on the requested play-out rate.

Figure 1:
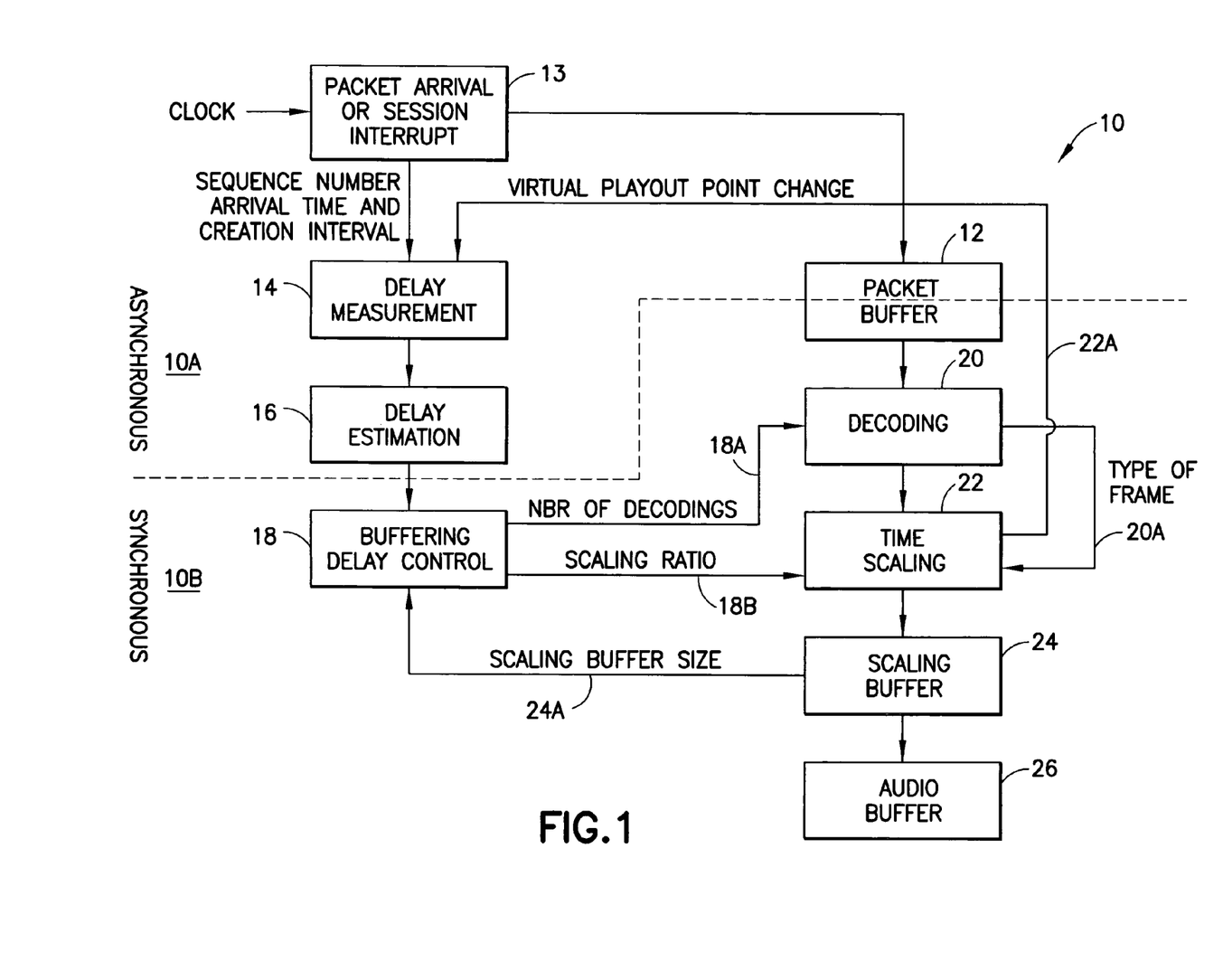
FIG. 1 is a high-level diagram of an adaptive packet buffer management system in accordance with this invention.

FIG. 1 is a high-level diagram of an adaptive packet buffer management system 10 in accordance with this invention.

The diagram of FIG. 1 may be considered to depict a hardware (HW) block diagram, or a software (SW) flow diagram, or more preferably a combination of HW and SW. It should be noted that the SW entity itself requires either a HW or a SW based clock 11, as the arrival times of packets is information that is preferred to be available. The clock 11 may be implemented as a counter that is incremented at 20 ms intervals, (i.e., at the rate of creation of voice frames for encoding), however if more exact timing is desired then the clock 11 can be implemented as a more precise SW counter or a HW clock. It is also preferred that the Voice Packets are sequence numbered at the sender.

The adaptive packet buffer management system 10 is considered to include an asynchronous portion or component 10A and a synchronous portion or component 10B. The play-out of voice frames is preferably started immediately after a first Voice Packet has arrived. The initial Buffering Delay is therefore zero, and it is increased during a voice session to cover the variations in packet arrival times. The Buffering Delay is maintained at desired level by reacting to changes in the throughput of packets. This is accomplished by using the Time Scaling of the voice signal, which enables changing the rate at which the voice is played out.

As was noted above, the asynchronous component 10A is used only as a packet arrives. As the packet arrives it is placed into a packet buffer 12 under control of Packet Arrival or Session Interrupt Block 13, and the Buffering Delay is measured in Block 14. After this measurement the estimates (Buffering Delay, interruption delay, arrival interval) are updated by Block 16. Equation (1) may be used to calculate the buffering delay for the incoming packet:

Buffering Delay=Virtual Play-out Point+packet creation interval* (incoming packet's sequence number−first packet's sequence number)−incoming packet's arrival time. (Eq. 1)

When the signal is time scaled the Virtual Play-out Point is changed correspondingly.

As was also noted above, for the synchronous component 10B the estimates are used in control of the Buffering Delay in Block 18 so that Buffering Delay is maintained at a large enough value to accommodate the variations in packet arrivals. The control Block 18 provides an output 18A for indicating a number of decodings to a Decoding Block 20, and a scaling ratio output 18B (the ratio between the scaled and the original signal lengths) to a Time Scaling Block 22. For example, if the allowed ratios are between 0.5 and 2.0, then the number of decodings can be 0, 1 or 2 times during a single 20 ms interval. Once the samples are time scaled they are placed in a scaling buffer 24. The fullness of the scaling buffer 24 varies depending on the Scaling Ratio being used, and therefore the current size (corresponding to the number of current entries) of the scaling buffer 24 (indicated by output 24A) is used by the control Block 18 for ensuring that there will be at least 160 samples every 20 ms supplied to the audio buffer 26, but also that the scaling buffer 24 will not overflow. In this case 160 samples correspond to a 20 ms frame duration when the voice signal is sampled at 8,000 Hz (i.e., 8,000 Hz*0.02 s=160). At every 20 ms interval 160 of the samples of the voice signal are transferred to the audio buffer 26 for further processing. The entire adaptive process is thus transparent for any audio processing that takes place after it.

It is noted that references herein to 20 ms intervals, and to 160 samples, are exemplary, as these values are representative of instantiations of a general voice frame creation interval and a number of samples in a voice frame, respectively.

When the signal is either time scaled, or the buffer underflows or overflows, the Virtual Play-out Point is changed correspondingly, as indicated by the output signal 22A from the Time Scaling Block 22. Buffer underflow occurs if there are no packets in the packet buffer 12 and the next packet has not yet arrived. Underflow of the buffer 12 therefore delays the next packets' play-out point, and it can be considered as lengthening the voice signal by Time Scaling (inserting voice frames). Buffer overflow occurs when there is no available space left on the buffer 12, and the oldest packet(s) has to be overwritten by the latest arriving packet(s). In this case it is often preferred that the play-out of at least one packet is skipped, so that the synchronization to incoming packets can be maintained. Skipping over packet sequence numbers can be considered as shortening the voice signal by Time Scaling (voice frames are removed).

The type of received voice frame that is detected at the Decoding Block 20 may be one of a bad frame, no frame (i.e., buffer underflow or non-frame), or a good (valid) frame. This information is employed by Time Scaling Block 22 when determining whether a frame should be time scaled, and is provided by the output 20A of the Decoding Block 20. Time Scaling is performed only if the type of the frame is indicated as being a good frame. A frame indicated as being bad is preferably not time scaled, as it represents discontinuities in the voice signal. A non-frame should also not be time scaled, as it is pointless to use the Time Scaling algorithm of Block 22 when the buffer 12 has underflowed.

Figure 2:
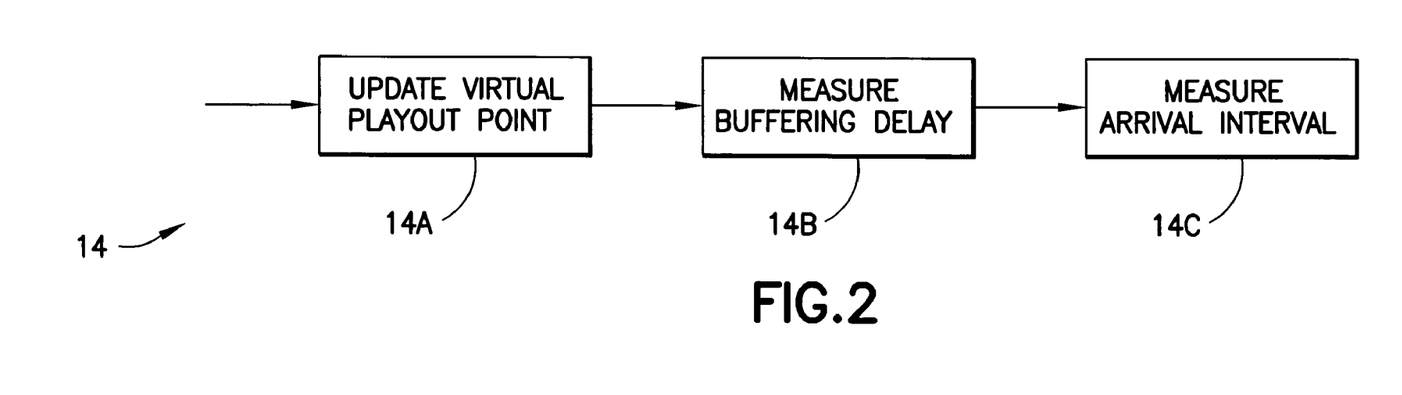
FIG. 2 illustrates a delay measurement process executed by the delay measurement block shown in FIG. 1.

FIG. 2 illustrates an overall delay measurement process executed by the delay measurement Block 14 of FIG. 1. The delay of the packet buffer 12 (the Buffering Delay) is measured for every arriving packet (14B). If there is an interruption in the voice session, then the Buffering Delay is updated before a response is made to the interruption (see FIG. 5 for a description of the response). In this manner the Buffering Delay corresponds to the current packet arrival situation. The arrival interval of packets is also measured (14C). The virtual play-out point is updated (14A) by adding the virtual play-out point change (indicated by output 22A of the Time Scaling Block 22) to the current virtual play-out point value. As was noted above, the virtual play-out point is the time at which the first packet should have been played, so that Equation (1), given above, can be used to calculate the buffering delay for the incoming packet.

If the Buffering Delay is measured by calculating the number of packets in the buffer 12, then the result is not exact in the case of packet loss, and in the case where packets arrive in other than the sequence number order. Therefore a different approach, that is exact in these circumstances, is preferred for use.

Figure 9A:
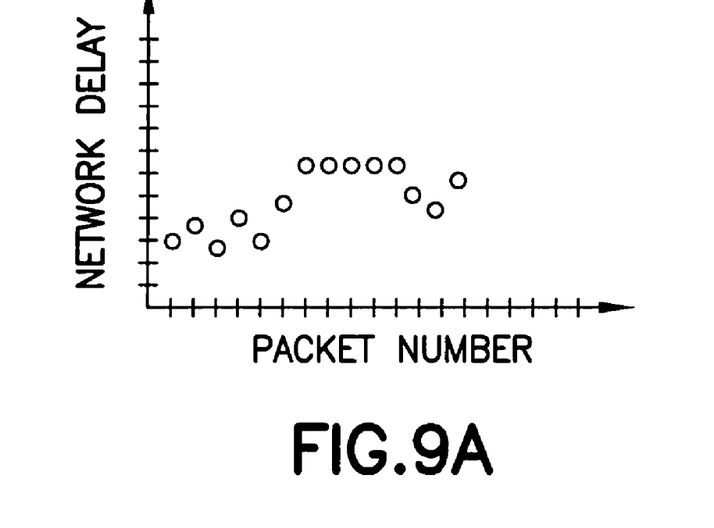
FIGS. 9A and 9B are graphs that plot delay versus packet number, more specifically that plot exemplary values of absolute network delay and Buffering Delay, respectively.
Figure 9B:
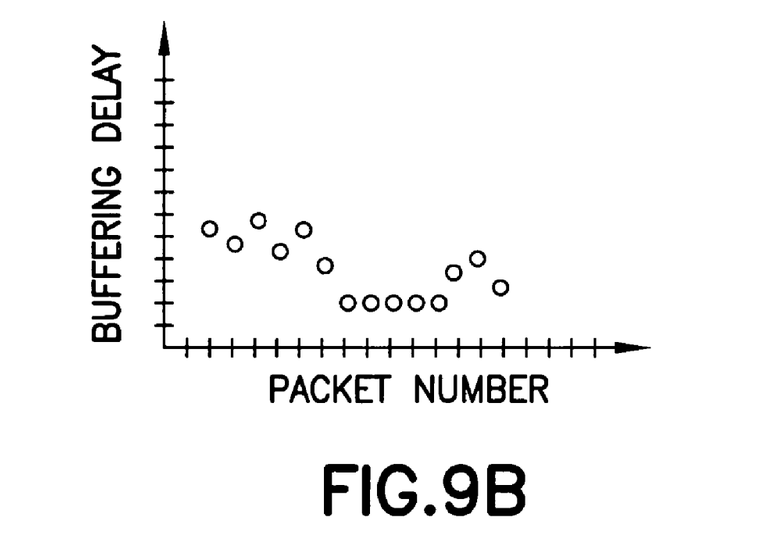

Further in this regard, FIGS. 9A and 9B show examples of absolute network delay and the Buffering Delay, respectively. It can be seen that the Buffering Delay is inversely proportional to the network delay, and both measurements thus contain the same information related to delay variations. The play-out point of the first packet is used when the play-out points for subsequent packets are calculated (see FIG. 10). The play-out point for the i:th packet is: $Tp_{i,n}=Tc*(N_i-N_1)+Tp_{1,n}$, where i is the number of the received packet, n is the number of the play-out point change, Tc is the creation interval of packets, and Ni is the sequence number of the i:th received packet. The Buffering Delay for the i:th packet is then: $d_i=Tp_{i,n}-Ta_i$, where $Ta_i$ is the arrival time of the i:th packet.

In the presently preferred embodiment of this invention, for the measurement of the Buffering Delay by Block 14 the arrival time, the sequence number, and the creation interval of the incoming packet are used.

The Buffering Delay measurement was shown above with respect to Equation (1), while the arrival interval can be measured by using the following Equation (2):

arrival interval=incoming packet's arrival time−previously arrived packet's arrival time. (2)

Figure 3:
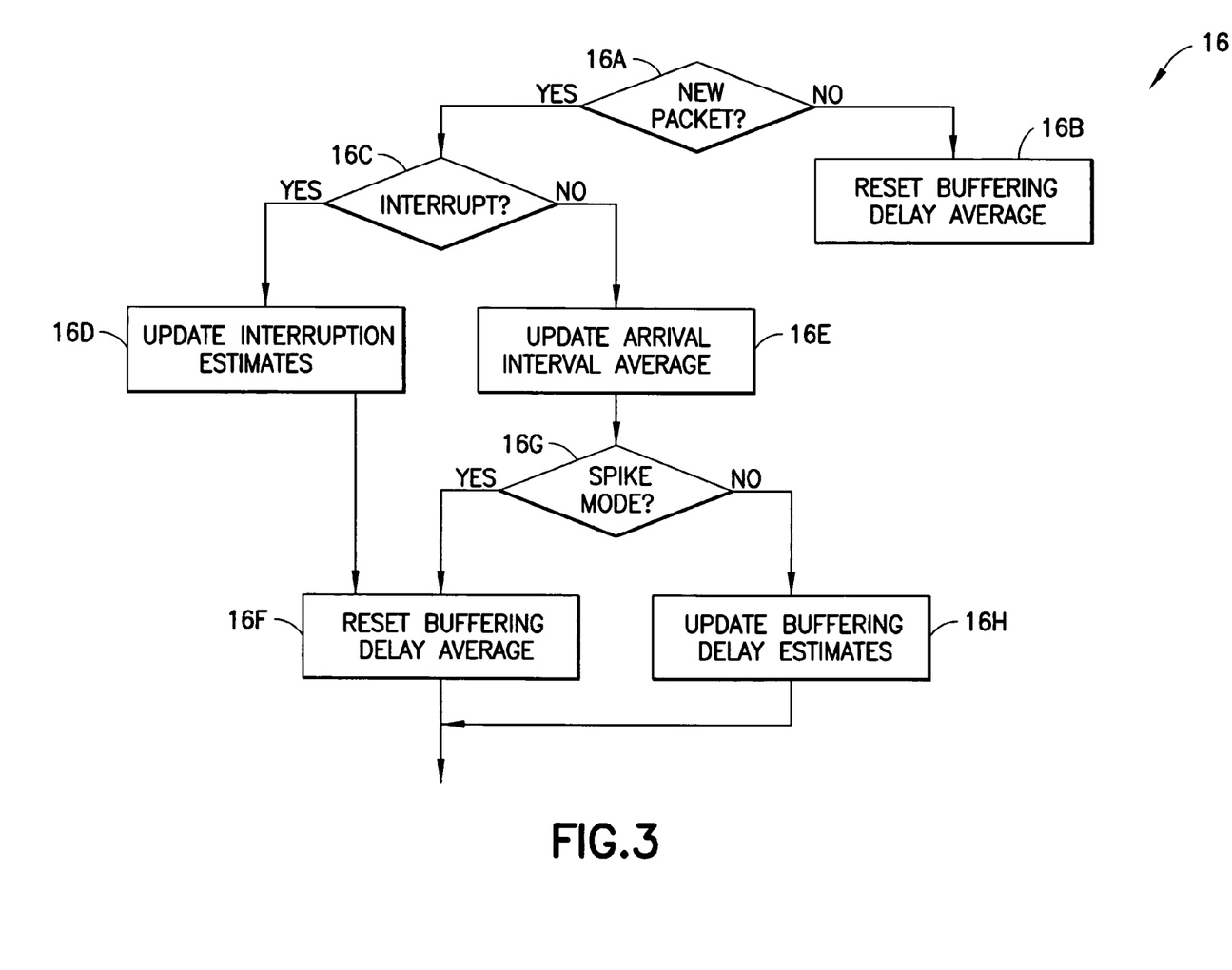
FIG. 3 shows a delay estimation process executed by the delay estimation block of FIG. 1.

FIG. 3 shows an overall delay estimation process executed by the delay estimation Block 16 of FIG. 1. In general, there are two separate primary cases to consider when updating delay estimates. The first case is that the delay estimation (block 16) function is called when no packet has arrived, and an amount of time has elapsed that is more than twice the packet creation interval (e.g., 2*20 ms=40 ms) since the previous packet arrived (Blocks 16A and 16B). When interruption is detected the Buffering Delay is measured as if the packet, having a sequence number that is equal to the previously arrived packet's sequence number (plus one), would have arrived. In this manner the Buffering Delay is the delay as if the next packet would have arrived at that specific time. The Buffering Delay average is preferably reset to the value of the last measured Buffering Delay, and in this manner the Buffering Delay average is made equal to current Buffering Delay, and the mean deviation is not updated. A consideration of this case ensures that the Buffering Delay average is reset to the current value of the Buffering Delay when an interruption of session is detected. The updated value of the Buffering Delay is needed when the Scaling Ratio to be used during interruption is determined. Information regarding the session interrupt is delivered to block 18D and used at 19A.

The second case is when the Delay Estimation (block 16) function is called when a new packet arrives. At Block 16C a determination is made whether there was a large enough delay between successive packets so that the delay would be considered as an interruption, that is, if the arrival interval is greater than twice the packet creation interval.

If there was an interruption in packet arrival then the interruption delay estimates are updated at Block 16D by using exponential averaging, and the Buffering Delay average is reset at Block 16F to current value of the Buffering Delay, so that the average immediately starts to follow new measurements. The mean deviation is not updated, neither is the arrival interval average.

Returning to Block 16E, if there was no interruption then the arrival interval average is updated by using exponential averaging. At Block 16G a determination is made whether the estimation mode is spike or normal mode. The mode is considered to be the spike mode if the arrival interval average is less than the creation interval. If the mode is deemed to be spike then the Buffering Delay is reset to last measured value (Block 16F), and the mean deviation is not updated. The mean deviation is preferably not updated if the arrival interval average is less than the creation interval, as it would needlessly increase the required Buffering Delay (see Equation (11) below). If the packet arrival mode is not spike, i.e., the mode is normal, then both the Buffering Delay average and mean deviation are updated by using exponential averaging at Block 16H.

It is important to note that the arrival interval average does not correspond to the actual arrival interval average, because the interruptions are not taken into account. Therefore, it may be considered as a record or memory of the arrival interval average between interruptions. By this manner the two important issues that affect the behavior of the Buffering Delay are separated. That is, the arrival interval of packets when the link is on, and the delay introduced by interruptions when the link is (temporarily) down, are kept separated from one another.

This approach corresponds well to the nature of packet switched networks, where it is typically the case that the packet arrival interval average is substantially equal to the value just before an interruption in packet arrival occurred.

The functionality of Block 16H (update Buffering Delay estimates) is now described in further detail. The Buffering Delay estimates are set to zero when a first packet arrives. After this the Buffering Delay average and mean deviation (MD) are updated by using the following Equations (3), (4) and (5). Note that the values shown in these equations are suggestions, as are also the values in Equations (6), (8) and (9), and that the actual values used are a compromise between the rate of convergence and accuracy. Note also that the Buffering Delay average is used when the mean deviation is calculated.

$$\text{Buffering Delay average} = 0.25 * \text{Buffering Delay} + 0.75 * \text{Buffering Delay average}; \quad (3)$$

$$\text{Buffering Delay } MD = 0.125 * |\text{Buffering Delay} - \text{Buffering Delay average}| + 0.875 * \text{Buffering Delay } MD. \quad (4)$$

If the Buffering Delay average is reset then the Buffering Delay average is set to the current value of the Buffering Delay, by using equation (5). The mean deviation is not changed.

$$\text{Buffering Delay average} = \text{Buffering Delay} \quad (5)$$

The functionality of Block 16E (update arrival interval average) is now described in further detail. The arrival interval average is updated only when no interruptions have occurred. A check is first made to determine whether the arrival interval average should be initialized. If it should then it can be alternatively set to correspond to the creation time of the first arrived packet, or it can be set according to the arrival interval between first and second arrived packets. The average is updated by preferably using exponential averaging, as in Equation (6):

$$\text{arrival interval average} = 0.125 * \text{arrival interval} + 0.875 * \text{arrival interval average}. \quad (6)$$

The functionality of Block 16D (update interruption delay estimates) is now described in further detail. The interruption delay is the difference between last measured arrival interval and packet creation interval, as shown in Equation (7):

$$\text{interruption delay} = \text{arrival interval} - \text{packet creation interval}. \quad (7)$$

A test is made whether the interruption delay estimates should be initialized. The estimates are initialized if the interruption delay average is zero. If initialized then the interruption delay average is set to the last measured interruption delay, and the mean deviation is set to zero. If not initialized, then the estimates are updated by using exponential averaging, in accordance with Equations (8) and (9):

$$\text{interruption delay average} = 0.25 * \text{interruption delay} + 0.75 * \text{interruption delay average}; \quad (8)$$

$$\text{interruption delay } MD = 0.125 * |\text{interruption delay} - \text{interruption delay average}| + 0.875 * \text{interruption delay } MD. \quad (9)$$

It is typically the case that the network environment remains relatively stable between successive voice sessions, and therefore the interruption delay estimates may be used (at least initially) in a following voice session. However, if no interruption occurs during the voice session, then the average is preferably halved, so that eventually it converges to zero. The mean deviation is preferably set to zero immediately if no interruption has occurred during that session. In this manner it is ensured that if the conditions improve then the interruption delay estimates will correspond to the improved conditions. Preferably the session is long enough for halving the estimate, and thus the average is not halved purposelessly for a case of a session that is so short in duration that an interruption could not have occurred. The length a valid session, after which the halving of the estimate can occur, can be, for example, at least about five seconds.

Figure 4:
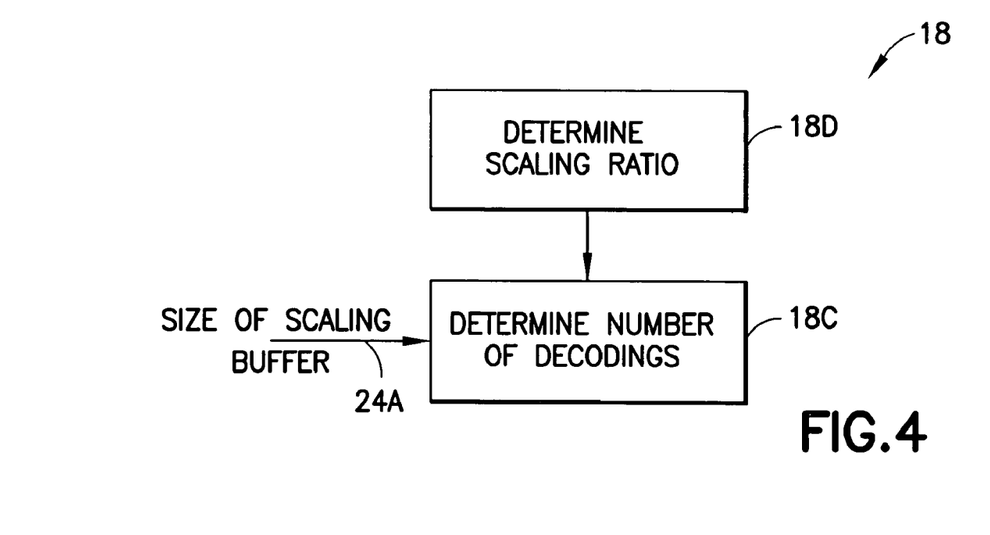
FIG. 4 illustrates the structure of the buffering delay control block of FIG. 1.

The functionality of Block 18 of FIG. 1, (Buffering Delay control) is now described in further detail in relation to FIG. 4, which shows the structure of the control for the Buffering Delay. The number of decodings is determined in Block 18C at each 20 ms interval. Block 18C operates in cooperation with the determine Scaling Ratio Block 18D, which is described in detail below in reference to FIG. 5. The size of the scaling buffer (output 24A from the scaling buffer Block 24) is used to ensure that after Time Scaling there will always be at least some predetermined number of samples (e.g., 160 samples), but no more than scaling buffer 24 can hold. If the current size (i.e., storage capacity) of the scaling buffer 24 is at least 160 samples then there is no need to perform decoding in Block 20. If there are less than 160 samples, and if the Scaling Ratio is at least one, then it can be assured that there will always be at least 160 samples after Time Scaling 22 for each decoding, and therefore one decoding operation is performed by Block 20. If there are less than 160 samples, and if the Scaling Ratio is less than one, then each Time Scaling produces less than 160 samples, and therefore the decoding is performed twice. In this manner it can be shown that the maximum size that should be reserved for the scaling buffer 24 is 480 samples (i.e. 60 ms).

Figure 5:
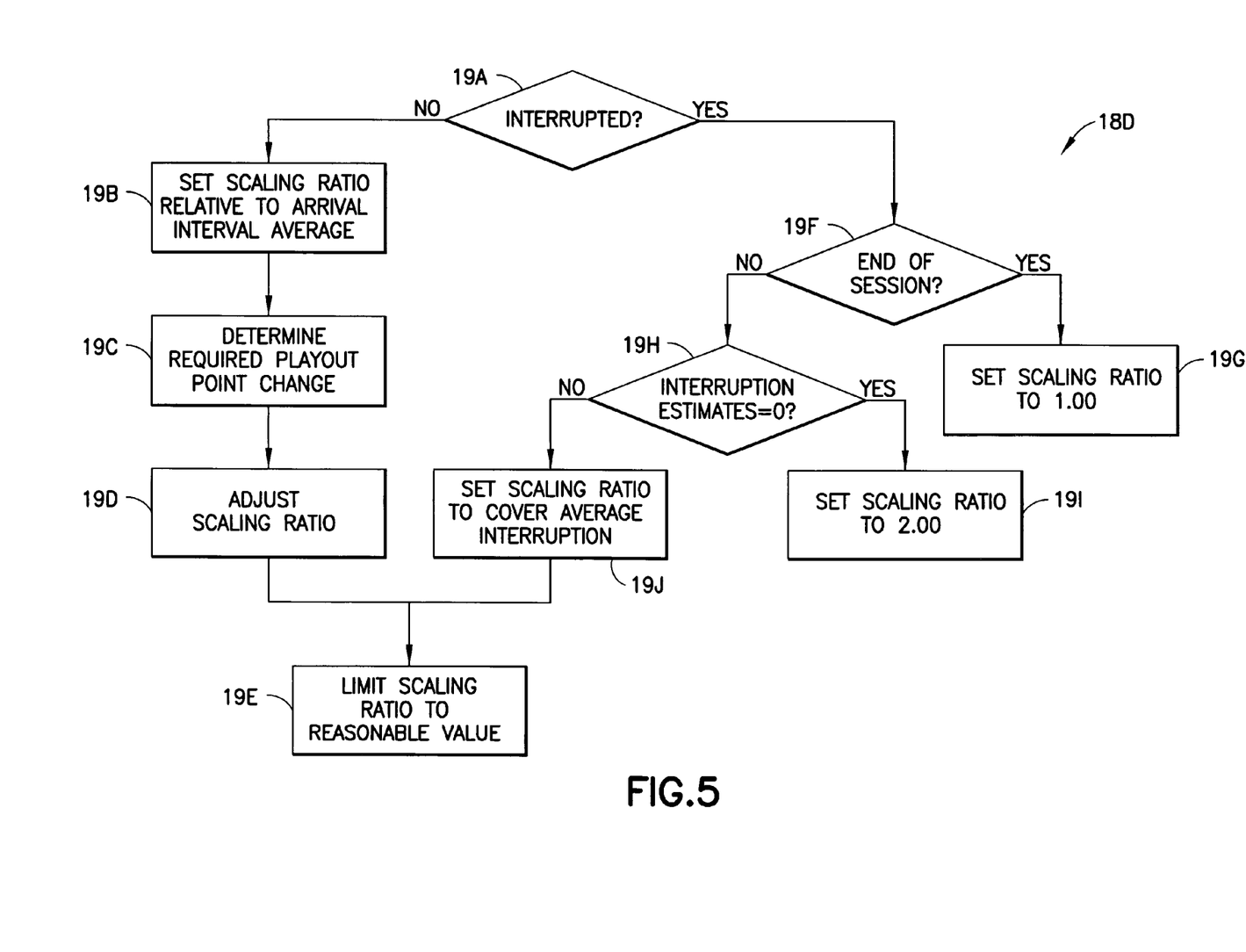
FIG. 5 illustrates the overall structure and operation of the determine scaling ratio block of FIG. 4.

The operation of the Determine Scaling Ratio Block 18D in FIG. 4 is now described in conjunction with FIG. 5, which shows the overall structure and operation of the Determine Scaling Ratio Block 18D. The manner in which the Scaling Ratio is determined depends on whether the session has been interrupted or has not been interrupted, as is determined at Block 19A. First, a description is made of how the ratio is determined if the session is not currently interrupted (Blocks 19B, 19C, 19D and 19E).

As was noted above, the Scaling Ratio is the ratio between scaled and original signal lengths, and it is determined in Block 19B by first setting it relative to the arrival interval average, as in Equation (10):

$$\text{Scaling Ratio} = \text{arrival interval average} / \text{packet creation interval}. \quad (10)$$

By using the Scaling Ratio obtained by Equation (10) the Buffering Delay can be held constant (assuming for this case that there are no interruptions in the packet arrivals), since voice is played out at the same rate as it arrives.

In order to cause the Buffering Delay to converge towards a desired value, an offset that has a value that is a function of the amount of the required play-out point change is added to the Scaling Ratio. First, the required Buffering Delay is obtained in accordance with Equation (11):

$$\text{required Buffering Delay} = \text{interruption delay average} + B * \text{interruption delay } MD + C * \text{Buffering Delay } MD. \quad (11)$$

In Equation (11) the setting of the values of the constants B and C is a compromise between guarding and end-to-end delay. For example, a reasonable value for both B and C is three. However, the maximum value of the required Buffering Delay should not be greater than the buffer's physical size allows.

The required play-out point change is then determined by Block 19C in accordance with Equation (12):

$$\text{required play-out point change} = \text{required Buffering Delay} \times \text{Buffering Delay average}. \quad (12)$$

The Buffering Delay average is preferred for use as it tends to be more stable than the Current Buffering Delay, as a desired goal is that Scaling Ratio also be as stable (non-fluctuating) as possible.

Figures 6, 7:
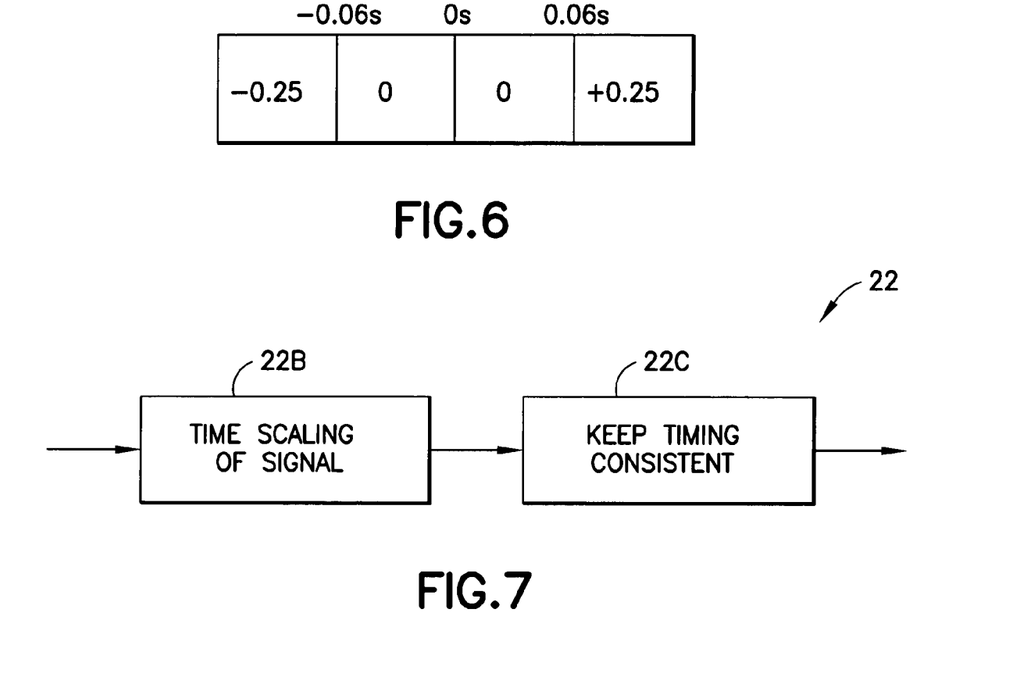
FIG. 6 illustrates an exemplary scaling ratio offset according to a required play-out point change.
FIG. 7 illustrates the overall structure and operation of the time scaling block of FIG. 1.

By using the required play-out point change the Scaling Ratio is adjusted by Block 19D so that the amount of offset is relative to the required amount. FIG. 6 illustrates how the required play-out point change affects the Scaling Ratio adjustment. If, for example, the required play-out point change is 0.08 s, then the Scaling Ratio calculated from arrival interval average is increased by an offset of 0.25. The area between the bounds +0.25 represents a hysteresis area. The wider is the hysteresis area the less the Scaling Ratio will fluctuate, however the required Buffering Delay is also obtained less accurately. Thus, the specific values shown in FIG. 6 may require an adjustment depending on the specifics of an implementation of this invention.

There is an exception to the Scaling Ratio offset determination procedure described above.

If the arrival interval average is less than 0.75, then the Scaling Ratio is less than 1.00, even if the required play-out point change is greater than zero. In this case it is, however, very likely that an interruption will occur due to buffer underflow at the network side, and therefore the voice play-out rate should not be less than 1.00, when the required play-out point change is greater than zero. To prevent this situation from occurring the lower limit for the Scaling Ratio is preferably set to 1.00 if the required play-out point change is greater than zero (Block 19E accommodates the limiting of the Scaling Ratio to a reasonable value).

Referring again to FIG. 5, specifically to Block 19A, a description is now made of how the Scaling Ratio is determined if the session has been interrupted. If it is known that the last packet for the current voice session has arrived (Block 19F), then the Scaling Ratio should be at most 1.00, and is set to 1.00 in Block 19G. If it is desired to minimize the end-to-end delay, then the Scaling Ratio may also be set to less than 1.00 at the end of the current voice session.

Assuming that the last packet of the session has not arrived, at Block 19H a determination is made if the interruption delay estimates are zero, and if this is the case then at Block 19I the Scaling Ratio is set to some maximum allowed value (for example, 2.00). In this manner the probability for packet buffer 12 underflow can be decreased for the case where there are no previous estimates of packet arrival interruptions. If the interruption estimates are not equal to zero at Block 19H, then at Block 19J the Scaling Ratio is set in accordance with Equation (13):

$$\text{Scaling Ratio} = (\text{required Buffering Delay} - \text{packet creation interval}) / \text{Buffering Delay average}. \quad (13)$$

This sets the Scaling Ratio to cover the average value of the interruption.

At this point it can be assumed that the current voice session has already been interrupted for a period of time that corresponds to the packet creation interval. Actually, a packet has not arrived for two times the packet creation interval, but the first interval does not count as it would have been the normal case. Also, at this point the Buffering Delay average corresponds to the current Buffering Delay, as was discussed above in the description of FIG. 3.

Equation (13) need be used only if the difference between required Buffering Delay and the packet creation interval is greater than the Buffering Delay average, otherwise Scaling Ratio is set to 1.00. The Scaling Ratio is preferably set only at the beginning of the interruption and maintained for the duration of the interruption. In this manner it can be ensured that the play-out rate of the voice signal can be held relatively constant in the case where there are frequent interruptions.

The Scaling Ratio is preferably limited to reasonable values, such as between 0.5 and 2.00, at Block 19E so that the voice play-out rates are not found to be objectionable by the listener. However, the exact values Scaling Ratio limits may best be determined empirically, and may be listener-dependent.

As was stated previously, the combination of the arrival interval average and the required play-out point change prevents unnecessary fluctuations in Scaling Ratio. This can be illustrated by the use of several examples. First, assume that an interruption is followed by a fast link, second, assume that an interruption is followed by a slow link, and third, assume that an interruption is followed by a normal link.

In the first case the packet arrival interval is considered to be fast, and the Scaling Ratio accordingly is less than one. Because the Buffering Delay decreases during the interruption the required play-out point change is greater than zero, and therefore the Scaling Ratio is equal, at a minimum, to one. It is therefore evident that the Buffering Delay begins to increase towards what is required to accommodate the average interruption, due to fact that the packets arrive faster than they are played out. When an interruption occurs the voice signal is played out at the ratio of 1.00, if the current Buffering Delay is sufficient to cover the duration of the average interruption.

In the second case (slow link) the arrival interval average causes the Scaling Ratio to be greater than one, and the required play-out point change being greater than 0.06 s only strengthens this, so that the Buffering Delay begins to move towards the desired value. It can therefore be concluded that the Scaling Ratio remains greater than or equal to one during and between interruptions.

In the third case (normal link) the arrival interval average is equal to the creation interval and therefore the Scaling Ratio accordingly is unity. However, if the required play-out point change is greater than 0.06s, then the final Scaling Ratio is 1.25. Again, the Buffering Delay begins to increase towards the desired value.

FIG. 7 illustrates the Time Scaling Block 22 of FIG. 1 in greater detail. Suitable Time Scaling algorithms include, but are not limited to, those described by: Wayman J. L. (1988), "Some Improvements on the Synchronized-overlap-add Method of Time Scale Modification for Use in Real-time Speech Compression and Noise Filtering", IEEE Transactions on Acoustics, Speech and Signal Processing, January, Vol.36, pp.139-140; Verhelst W. (1993), "An Overlap-add technique Based on Waveform Similarity (WSOLA) for High Quality Time-scale Modification of Speech", IEEE International Conference on Acoustics, Speech, and Signal Processing, 27-30 April, Minneapolis, Vol.2, pp. 554-557, USA; and Stenger A. (1996), "A New Error Concealment Technique for Audio Transmission with Packet Loss", European Signal Processing Conference, Trieste, 10-13 September, pp. 1965-1968, Italy.

Various specific optimizations of the above-described Time Scaling algorithms can be employed, however conventional algorithms can be used as well.

The selected Time Scaling algorithm makes the signal modification according to the Scaling Ratio (see FIG. 5).

From the input signal some number of the samples are either removed or reproduced (copied) so that the ratio between the input and output signal lengths corresponds to required Scaling Ratio (Block 22B). The timing is kept consistent in Block 22C by modifying the Virtual Play-out Point change (output 22A in FIG. 1) according to the number of samples that are removed or copied. If the type of decoded frame, indicated by the input 20A shown in FIG. 1, was no frame or bad frame, then it is passed through the Time Scaling algorithm using the ratio 1.00. The underflow of the scaling buffer 24 results in a no frame condition, and it moves the play-out point of the next packet 20 ms forward, therefore this is considered as Time Scaling of the voice signal by 160 samples, and the Virtual Play-out Point change is equivalently modified in Block 22C.

After each call of Time Scaling algorithm in Block 22B the output samples are input to the scaling buffer 24. When Time Scaling algorithm has been called for the last time for the current 20 ms interval, the oldest 160 samples in the scaling buffer 24 are moved to audio buffer 26 for further processing.

Figure 8:
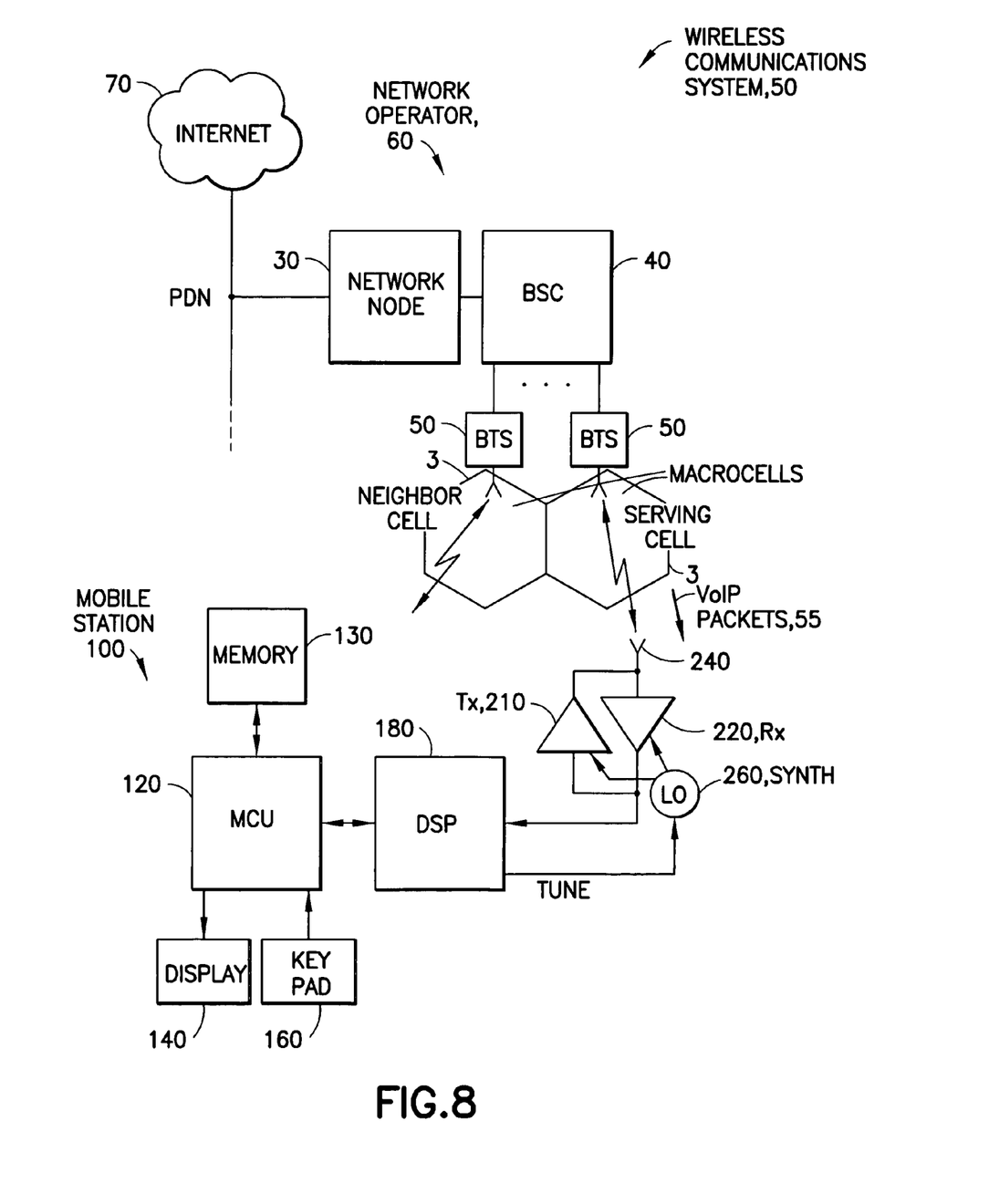
FIG. 8 is a simplified block diagram of a mobile station and wireless network that is one suitable embodiment for practicing the invention shown in FIGS. 1-7.

FIG. 8 shows a simplified block diagram a non-limiting embodiment of a wireless communications system 50 that is suitable for practicing this invention. The wireless communications system 50 includes at least one mobile station (MS) 100. FIG. 8 also shows an exemplary network operator 60 having, for example, a node 30 for connecting to a telecommunications network, such as a Public Packet Data Network or PDN, at least one base station controller (BSC) 40 or equivalent apparatus, and a plurality of base transceiver stations (BTS) 50, also referred to as base stations (BSs), that transmit in a forward or downlink direction both physical and logical channels to the mobile station 100 in accordance with a predetermined air interface standard. A reverse or uplink communication path also exists from the mobile station 100 to the network operator, which conveys mobile originated access requests and traffic. A cell 3 is associated with each BTS 50, where one cell will at any given time be considered to be a serving cell, while an adjacent cell(s) will be considered to be a neighbor cell. Smaller cells (e.g., picocells) may also be available.

The air interface standard can conform to any suitable standard or protocol, and may enable both voice and data traffic, such as data traffic enabling Internet 70 access and web page downloads. In the presently preferred embodiment of this invention the air interface standard is one that enables a VoIP functionality to be realized by the MS 100, and thus IP packets arriving from the Internet 70 are assumed to contain voice signal samples for playback at the MS 100 (i.e., VoIP packets 55). However, and as was noted previously, the arriving IP packets may contain other information, such as video information.

The mobile station 100 typically includes a control unit or control logic, such as a microcontrol unit (MCU) 120 having an output coupled to an input of a display 140 and an input coupled to an output of a keyboard or keypad 160. The mobile station 100 may be a handheld radiotelephone, such as a cellular telephone or a personal communicator. The mobile station 100 could also be contained within a card or module that is connected during use to another device. For example, the mobile station 10 could be contained within a PCMCIA or similar type of card or module that is installed during use within a portable data processor, such as a laptop or notebook computer, or even a computer that is wearable by the user.

The MCU 120 is assumed to include or be coupled to some type of a memory 130, including a non-volatile memory for storing an operating program and other information, as well as a volatile memory for temporarily storing required data, scratchpad memory, received packet data, packet data to be transmitted, and the like. The operating program is assumed, for the purposes of this invention, to enable the MCU 120 to execute the software routines, layers and protocols required to implement the adaptive voice play-out and buffering methods in accordance with this invention, as well as to provide a suitable user interface (UI), via display 140 and keypad 160, with a user. Although not shown, a microphone and speaker are typically provided for enabling the user to conduct voice calls in a conventional manner and, in accordance with this invention, to enable the voice signals from the audio buffer 26 of FIG. 1 to be played out to the user of the MS 100.

The mobile station 100 also contains a wireless section that includes a digital signal processor (DSP) 180, or equivalent high speed processor or logic, as well as a wireless transceiver that includes a transmitter 200 and a receiver 220, both of which are coupled to an antenna 240 for communication with the network operator. At least one local oscillator, such as a frequency synthesizer (SYNTH) 260, is provided for tuning the transceiver. Data, such as digitized voice and packet data, is transmitted and received through the antenna 240.

The various blocks described in reference to FIGS. 1-7 may be variously implemented in hardware, software or as a combination of hardware and software. In a typical case the various voice buffers will be implemented using locations in the memory 130, under the control and management of the MCU 120, and the various functional blocks, such as the Decoding and Time Scaling Blocks 20 and 22, are implemented by the MCU 120 while executing program instructions read from the memory 130. However, it should be noted that in some embodiments the overall adaptive management function (including voice signal modifications) would preferably be implemented using the DSP 180.

Based on the foregoing description it should be appreciated that one advantage of the use of this invention is that the possibility of interruptions in the voice signal can be significantly decreased as compared to traditional buffering techniques. With traditional buffering the introduced Buffering Delay may be unnecessarily large, or on the other hand too small, in certain situations. Therefore, with traditional buffering the perceived voice quality becomes a compromise between the introduced Buffering Delay and the actual experienced interruptions in output voice. By using the adaptive buffer management technique of this invention, this compromise can be avoided. With the adaptive buffer management in accordance with this invention only a necessary amount of Buffering Delay is introduced, as the buffering depth is made relative to the latest interruptions in the arrival of the voice-containing packets.

In the preferred embodiment of this invention, and in that the Buffering Delay can be changed continuously during a voice period, the time relationship between voice periods and silence periods is not affected, and discontinuities are avoided.

The adaptive voice buffering and play-out management made possible by the use of this invention affects the voice signal only when there is a need. This concept correlates well with error correction methods in general, which typically operate only when an error has occurred. While the voice play-out may be slower or faster than the original when the average throughput of the arriving packets is not ideal, this is, however, less annoying to the listener than constant interruptions in the output voice.

Assuming the use of an audio source with a steady play-out rate, and if Voice Packets are received at a terminal at a constantly slower rate than the packets are created, then by the use of this invention the speed of the output voice should be slower than the original. Assuming instead the use of an audio source in which random output interruptions are generated, and Voice Packets between interruptions are received at the terminal at a higher rate than the rate at which the Voice Packets are created such that the long-term average of the arrival interval is approximately that of the packet creation interval, the use of this invention results in substantially imperceptible fluctuations in the speed of the output voice.

This invention is applicable to any VoIP terminal, and in general to any device connected to the Internet or any other packet switched network, and is thus not limited for use with only the mobile station 100, wireless network 50 embodiment that was described above with reference to FIG. 8.

The use of this invention provides also for the possibility to realize continuous output voice at the terminal when the throughput of the voice has significant variations. Therefore the use of this invention improves the observed quality of output voice in devices connected to packet switched networks through which voice signal containing packets are received.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. As but some examples, the use of other similar or equivalent time durations, numbers of samples, buffer sizes, ratios and the like may be attempted by those skilled in the art. In addition, in wireless embodiments of this invention the link can comprise an optical link, and need not comprise an RF link. Also the terminal may have a wired connection to network. However, all such and similar modifications of the teachings of this invention will still fall within the scope of this invention.

Further, while described above primarily in the context of a mobile telephone, such as a cellular telephone terminal or mobile station 100, this invention can be applied to any terminal that can be connected to a packet switched network, and that is capable of receiving and playing voice in packets. Thus, these teachings are also applicable to, for example, pocket PCs, laptop PCs and desktop PCs, as well as to personal organizers and personal digital assistants (PDAs) that have voice, or more generally audio, capability. Furthermore, and was also noted above, this invention can be applied to those systems having at least one packet-receiving terminal or device wherein received packets convey time-ordered content that is intended to be presented to a listener or a viewer in a substantially continuous and substantially uniform temporal sequence (i.e., in a manner that is substantially free of interruptions and discontinuities). Voice content and video content are two non-limiting examples of time-ordered content.

Furthermore, some of the features of the present invention could be used to advantage without the corresponding use of other features. As such, the foregoing description should be considered as merely illustrative of the principles of the present invention, and not in limitation thereof.

What is claimed is:

1. A method comprising:
   operating a Voice over IP capable device that is coupled to a packet network by:
   receiving and buffering data packets that comprise voice information;
   decoding the voice information to obtain voice samples; and
   buffering the decoded voice samples prior to generating a voice play-out signal,
   where the decoded voice samples are time scaled as a function of packet network conditions according to a desired scaling ratio to adjust a Buffering Delay to enable changing the voice play-out rate to provide a substantially continuous output voice signal when the data packets are received at a rate that differs from a rate at which the data packets are created wherein time scaling according to a desired scaling ratio relating input and output voice samples is accomplished by at least one of removing and copying input voice sample intervals when generating output voice samples.

2. A method as in claim 1, comprising a substantially asynchronous component that determines data packet arrival delays, and a substantially synchronous component that is responsive to the operation of the asynchronous component to control the Buffering Delay based on Time Scaling of the decoded voice samples.

3. A method as in claim 1, where the Buffering Delay of a packet buffer is a time period that a packet resides in the packet buffer before play-out of the first frame of the packet.

4. A method as in claim 3, further comprising revising estimates of at least packet interruption delay average and mean deviation, packet arrival interval average, Buffering Delay average and mean deviation.

5. A method as in claim 3, further comprising measuring the Buffering Delay as being equal to a Virtual Play-out Point plus a packet creation interval times (an incoming packet's sequence number less a first packet's sequence number), less the incoming packet's arrival time.

6. A method as in claim 3, further comprising measuring the Buffering Delay as being a function of a Virtual Play-out Point, which is a Play-out Point that should have been used for the first packet of a voice session, if the remainder of the packets would have been played out at a steady rate, while still resulting in the same end-to-end delay as with an actual non-steady play-out of packets.

7. A method as in claim 6, where when the decoded voice samples are time scaled, or a received packet buffer underflows or overflows, the Virtual Play-out Point is changed correspondingly.

8. A method as in claim 1, where decoding includes detecting a type of received voice frame as being one of a bad frame, no frame, or a good frame, and where Time Scaling is performed only if the type of the received voice frame is detected as being a good frame.

9. A device comprising:
   a receiver for receiving and buffering data packets that comprise voice information;
   a decoder for decoding the voice information to obtain voice samples;
   a buffer for buffering the decoded voice samples prior to generating a voice play-out signal; and,
   a time scaling function interposed between said decoder and said buffer for time scaling decoded voice samples as a function of packet network conditions according to a desired scaling ratio to adjust a Buffering Delay to enable changing the voice play-out rated to provide a substantially continuous output voice signal when the data packets are received at a rate that differs from a rate at which the data packets are created wherein time scaling according to a desired scaling ratio relating input and output voice samples is accomplished by at least one of removing and copying input voice sample intervals when generating output voice samples.

10. A device as in claim 9, comprising a substantially asynchronous component that determines data packet arrival delays, and a substantially synchronous component that is responsive to the operation of the asynchronous component to control the Buffering Delay based on Time Scaling of the decoded voice samples.

11. A device as in claim 9, where a Buffering Delay of a received packet buffer is a time period that a packet resides in the packet buffer before play-out of the first frame of the packet.

12. A device as in claim 11, further comprising means for revising estimates of at least packet interruption delay average and mean deviation, packet arrival interval average, Buffering Delay average and mean deviation.

13. A device as in claim 11, further comprising means for estimating the Buffering Delay as being equal to a Virtual Play-out Point plus a packet creation interval times (an incoming packet's sequence number less a first packet's sequence number), less the incoming packet's arrival time.

14. A device as in claim 11, further comprising means for estimating the Buffering Delay as being a function of a Virtual Play-out Point, which is a Play-out Point that should have been used for the first packet of a voice session, if the remainder of the packets would have been played out at a steady rate, while still resulting in the same end-to-end delay as with an actual non-steady play-out of packets.

15. A device as in claim 14, where when the decoded voice samples are time scaled, or a packet buffer underflows or overflows, the virtual play-out point is changed correspondingly.

16. A device as in claim 9, where said decoder comprises means for detecting a type of received voice frame as being one of a bad frame, no frame, or a good frame, and where said Time Scaling function operates only if the received voice frame is detected as being a good frame.

17. A computer program product comprising: a computer readable medium embodying a computer program for directing a data processor to operate a device that is coupled to a packet switched network, the computer program comprising:
program code to receive and buffer data packets that comprise time-ordered content that is intended to be presented to a user in a substantially continuous and substantially uniform temporal sequence;
program code to decode the content to obtain samples for use in making a presentation to the user during a sample play-out period; and
program code, responsive to packet network conditions, to time scale samples according to a desired scaling ratio for enabling changing a play-out rate to provide a substantially continuous and uniform presentation when the data packets are received at a rate that differs from a rate at which the data packets are created wherein time scaling according to a desired scaling ratio relating input and output voice samples is accomplished by at least one of removing and copying input voice sample intervals when generating output samples.

18. A computer program product as in claim 17, wherein said computer program further comprises a substantially asynchronous component that determines data packet arrival delays, and a substantially synchronous component that is responsive to the operation of the asynchronous component to control packet buffering delay based on the time scaling.

19. A computer program product as in claim 17, where said time-ordered content comprises a voice signal, and where samples are time scaled by one of deleting or reproducing samples, as a function of whether data packets are arriving faster or slower, respectively, than the rate at which the data packets are created.

20. A computer program product as in claim 17, where said time-ordered content comprises a video signal, and where samples are time scaled by one of deleting or inserting video frames or samples, as a function of whether data packets are arriving faster or slower, respectively, than the rate at which the data packets are created.

21. A computer program product as in claim 20, where video and audio are controlled separately and are synchronized by maintaining a virtual play-out point for each time synchronized.

22. A computer program product as in claim 17, further comprising program code to measure a delay for each arriving packet and, if there is an interruption in the arrival of one or more packets, said program code updates at least a Buffering Delay value, a Virtual Play-out Point value, and an Interruption Delay value.

23. A computer program product as in claim 17, where a Buffering Delay value is set to zero when a first packet arrives, and further comprising program code to update a Buffering Delay Average value and, using the updated Buffering Delay Average value, a Buffering Delay Mean Deviation value.

24. A computer program product as in claim 17, further comprising program code to measure a delay for each arriving packet and, if an interruption in packet arrival is detected, said program code updates at least an Interruption Delay average value using exponential averaging, and if an interruption in packet arrival is not detected, said program code updates at least an Arrival Interval Average value using exponential averaging.

25. A computer program product as in claim 17, where said device comprises a receiver for coupling to the packet switched network through a wireless link.

26. A computer program product as in claim 17, where said device comprises a receiver for coupling to the packet switched network through a wired link.

27. A computer program product as in claim 17, where said device comprises a cellular telephone having an RF receiver for coupling wirelessly to the packet switched network.

28. A method comprising:
operating a device that is coupled to a packet network by:
receiving and buffering data packets that comprise information that is representative of time-ordered content that is intended to be presented to a person in a substantially continuous and substantially uniform temporal sequence;
decoding the information to obtain samples; and
buffering the samples prior to generating a play-out signal, where the samples are time scaled as a function of packet network conditions according to a desired scaling ratio to adjust a Buffering Delay to enable changing the play-out rate to provide a substantially continuous output signal when the data packets are received at a rate that differs from a rate at which the data packets are created wherein time scaling according to a desired scaling ratio relating input and output samples is accomplished by at least one of removing and copying input voice sample intervals when generating output samples.

29. A method as in claim 28, comprising a substantially asynchronous component that determines data packet arrival delays, and a substantially synchronous component that is responsive to the operation of the asynchronous component to control the Buffering Delay based on Time Scaling of the decoded samples.

30. A method as in claim 28, where the time-ordered content comprises a voice signal, and where samples are time scaled by one of deleting or reproducing samples, as a function of whether data packets are arriving faster or slower, respectively, than the rate at which the data packets are created.

31. A method as in claim 28, where the time-ordered content comprises a video signal, and where samples are time scaled by one of deleting or inserting video frames or samples, as a function of whether data packets are arriving faster or slower, respectively, than the rate at which the data packets are created.

32. A device comprising:
   a receiver for data packets that comprise information that is representative of time-ordered content that is intended to be presented to a person in a substantially continuous and substantially uniform temporal sequence;
   a decoder to decode the information to obtain samples;
   a buffer for storing the samples prior to generating a play-out signal; and
   a scaler for time scaling samples as a function of packet network conditions according to a desired scaling ratio to adjust a Buffering Delay to enable changing the play-out rate to provide a substantially continuous output signal when the data packets are received at a rate that differs from a rate at which the data packets are created wherein time scaling according to a desired scaling ratio relating input and output samples is accomplished by at least one of removing and copying input voice sample intervals when generating output samples.

33. A device as in claim 32, where said device comprises a substantially asynchronous component that determines data packet arrival delays, and a substantially synchronous component that is responsive to the operation of the asynchronous component to control the Buffering Delay based on Time Scaling of the decoded samples.

34. A device as in claim 32, where the time-ordered content comprises a voice signal, and where samples are time scaled by one of deleting or reproducing samples, as a function of whether data packets are arriving faster or slower, respectively, than the rate at which the data packets are created.

35. A device as in claim 32, where the time-ordered content comprises a video signal, and where samples are time scaled by one of deleting or inserting video frames or samples, as a function of whether data packets are arriving faster or slower, respectively, than the rate at which the data packets are created.

* * * * *